United States Patent
Beaulne et al.

(10) Patent No.: US 6,805,159 B2
(45) Date of Patent: Oct. 19, 2004

(54) FUEL REFILLING ASSEMBLY

(76) Inventors: Michael A. Beaulne, 25 Maitland Street, Toronto, Ontario (CA), M4Y 2W1; Ronald G. Stark, 4 Metzak Drive, Brampton, ON (CA), L6Z 3R9

( * ) Notice: Subject to any disclaimer, the term of this patent is extended or adjusted under 35 U.S.C. 154(b) by 30 days.

(21) Appl. No.: 10/264,027

(22) Filed: Oct. 3, 2002

(65) Prior Publication Data

US 2003/0075221 A1 Apr. 24, 2003

Related U.S. Application Data

(60) Provisional application No. 60/326,869, filed on Oct. 3, 2001.

(51) Int. Cl.[7] .............................................. F16K 24/00
(52) U.S. Cl. ......................... 137/589; 137/588; 251/54; 141/59; 141/302
(58) Field of Search ................... 141/302, 59; 137/588, 137/589; 251/54, 89.5, 149.6

(56) References Cited

U.S. PATENT DOCUMENTS

| | | | |
|---|---|---|---|
| 3,177,894 A | * | 4/1965 | Camp ........................... 251/54 |
| 3,942,551 A | * | 3/1976 | Schuller et al. ................ 251/54 |
| 4,706,708 A | | 11/1987 | Fornuto et al. ............. 137/588 |
| 5,103,877 A | * | 4/1992 | Sherwood et al. ............ 141/59 |
| 5,439,129 A | * | 8/1995 | Buechler .................... 220/86.2 |
| 5,522,485 A | | 6/1996 | Takahashi et al. .......... 188/306 |
| 5,862,896 A | | 1/1999 | Villbrandt et al. .......... 188/293 |
| 5,924,757 A | | 7/1999 | Stapf .............................. 16/82 |
| 5,947,153 A | * | 9/1999 | Bucci et al. ................. 137/588 |
| 6,105,612 A | * | 8/2000 | Schaar ........................ 137/588 |
| 6,230,739 B1 | * | 5/2001 | Gericke ....................... 137/588 |

* cited by examiner

*Primary Examiner*—A. Michael Chambers
(74) *Attorney, Agent, or Firm*—Clark Hill PLC

(57) ABSTRACT

A fuel refilling assembly for transferring fuel from a nozzle to a fuel tank of a motor vehicle. The fuel refilling assembly includes a fuel filler neck extending out from the fuel tank. The fuel filler neck has a tank end disposed adjacent the fuel tank and a distal end. A housing is fixedly secured to the distal end of the fuel filler neck. The housing defines an opening for receiving the nozzle therethrough. A flapper door is pivotally secured to the housing and is movable between a closed position for preventing access from the housing to the fuel filler neck, and an open position for allowing the nozzle to transfer fuel to the fuel tank via the fuel filler neck. A dampener mechanism abuts the flapper door. The dampener mechanism dampens the movement of the flapper door as the flapper door moves from the open position to the closed position upon the removal of the nozzle. As a result, excess fuel left in the housing after the nozzle has been removed therefrom is allowed to flow into the fuel filler neck prior to the flapper door moving to its closed position.

24 Claims, 6 Drawing Sheets

FUEL REFILLING ASSEMBLY

RELATED APPLICATION

This application claims priority to and all the benefits of U.S. Provisional Patent Application No. 60/326,869, filed on Oct. 3, 2001.

FIELD OF THE INVENTION

This invention relates to a fuel refilling assembly for a motor vehicle. More particularly, the invention relates to a fuel refilling assembly for transferring fuel from a nozzle to a fuel tank of a motor vehicle.

DESCRIPTION OF THE RELATED ART

A fuel filler neck extends between a fuel tank of a motor vehicle and an access housing, which is positioned along a body of the motor vehicle. While filling the fuel tank, a nozzle is inserted through an opening of the access housing to deliver fuel to the fuel tank. Typically, a gas cap is removably secured to the access housing over the opening thereof to prevent leakage of liquid or vapor fuel and to keep contaminants out of the fuel tank. The gas cap is threaded onto the housing. The gas cap may also be sealed to the housing. One common seal is an elastomeric gasket, which is compressed as the gas cap threadedly engages the housing.

Gas caps are continually being removed and screwed back onto the access housing. There are times when a user forgets to screw the gas cap back on after filling the fuel tank. The absence of the gas cap creates an open pathway between the outside environment and the fuel filler neck and fuel tank. This open pathway can lead to fuel spillage, the release of gasoline vapors, and/or the intrusion of dust, dirt, or water into the fuel tank, the latter of which can result in damage to an engine of the motor vehicle.

In addition, the failure to reapply the gas cap can interfere with a leak diagnostic system of a motor vehicle. The leak diagnostic system checks for leaks in the fuel tank. When the gas cap is not reapplied after filling the fuel tank, the leak diagnostic system will interpret the absence of the gas cap as a leak in the fuel tank. As a result, the leak diagnostic system will report the leak in the fuel tank to an operator of the motor vehicle (even though such a leak is not present), resulting in an increase in the number of warranty issues for original equipment manufacturers and in the number of consumer complaints.

Another problem associated with gas caps involves the spraying of fuel from the housing to the outside environment upon removal of the gas cap. The fuel tank, the fuel filler neck, and the housing can occasionally become pressurized just prior to fueling. Thus, when a user removes the gas cap to fill the fuel tank, residual fuel in the housing can spray outside of the motor vehicle due to the quick pressure release created when the gas cap is removed. The fuel that exits the housing is harmful to the outside environment. Fuel can also be released to the outside environment during a failed nozzle event, that is, in a situation in which the nozzle does not shut off when the fuel filler neck and the fuel tank are full.

In order to obviate at least some of the above-mentioned disadvantages, numerous refueling systems for motor vehicles have been developed. For example, U.S. Pat. No. 6,230,739 to Gericke discloses a refilling assembly for a motor vehicle. The refilling assembly includes a housing secured to a fuel filler neck for receiving a nozzle. A valve body mounted to the housing moves between seated and unseated positions for equalizing the pressure within the fuel filler neck and a fuel tank. An actuator is pivotally secured to the housing and engages the valve body to move the valve body from the seated position to the unseated position when the nozzle is received within the fuel filler neck, thereby venting pressurized fluid from the fuel filler neck prior to the complete insertion of the nozzle into the fuel filler neck.

SUMMARY OF THE INVENTION

A fuel refilling assembly transfers fuel from a nozzle to a fuel tank of a motor vehicle. The fuel refilling assembly includes a fuel filler neck extending out from the fuel tank. The fuel filler neck has a tank end disposed adjacent the fuel tank and a distal end. A housing is fixedly secured to the distal end of the fuel filler neck. The housing defines an opening for receiving the nozzle therethrough. A flapper door is pivotally secured to the housing and is movable between a closed position for preventing access from the housing to the fuel filler neck, and an open position for allowing the nozzle to transfer fuel to the fuel tank via the fuel filler neck. A dampener mechanism abuts the flapper door. The dampener mechanism dampens the movement of the flapper door as the flapper door moves from the open position to the closed position upon the removal of the nozzle. As a result, excess fuel left in the housing after the nozzle has been removed therefrom is allowed to flow into the fuel filler neck prior to the flapper door moving to its closed position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
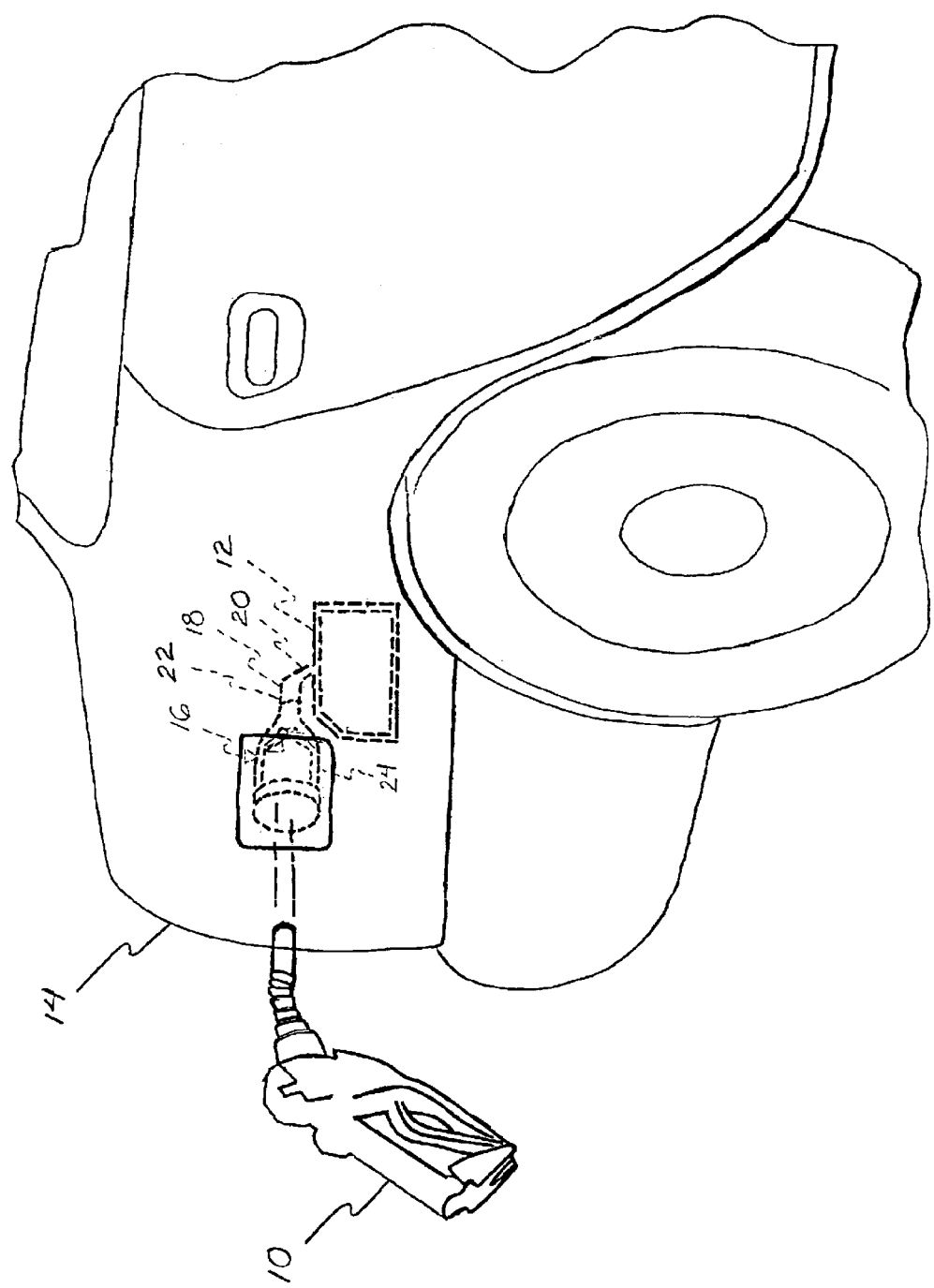
FIG. 1 is a perspective view, partially cut away, of a motor vehicle incorporating a fuel refilling assembly of one embodiment of the invention.
Figure 2:
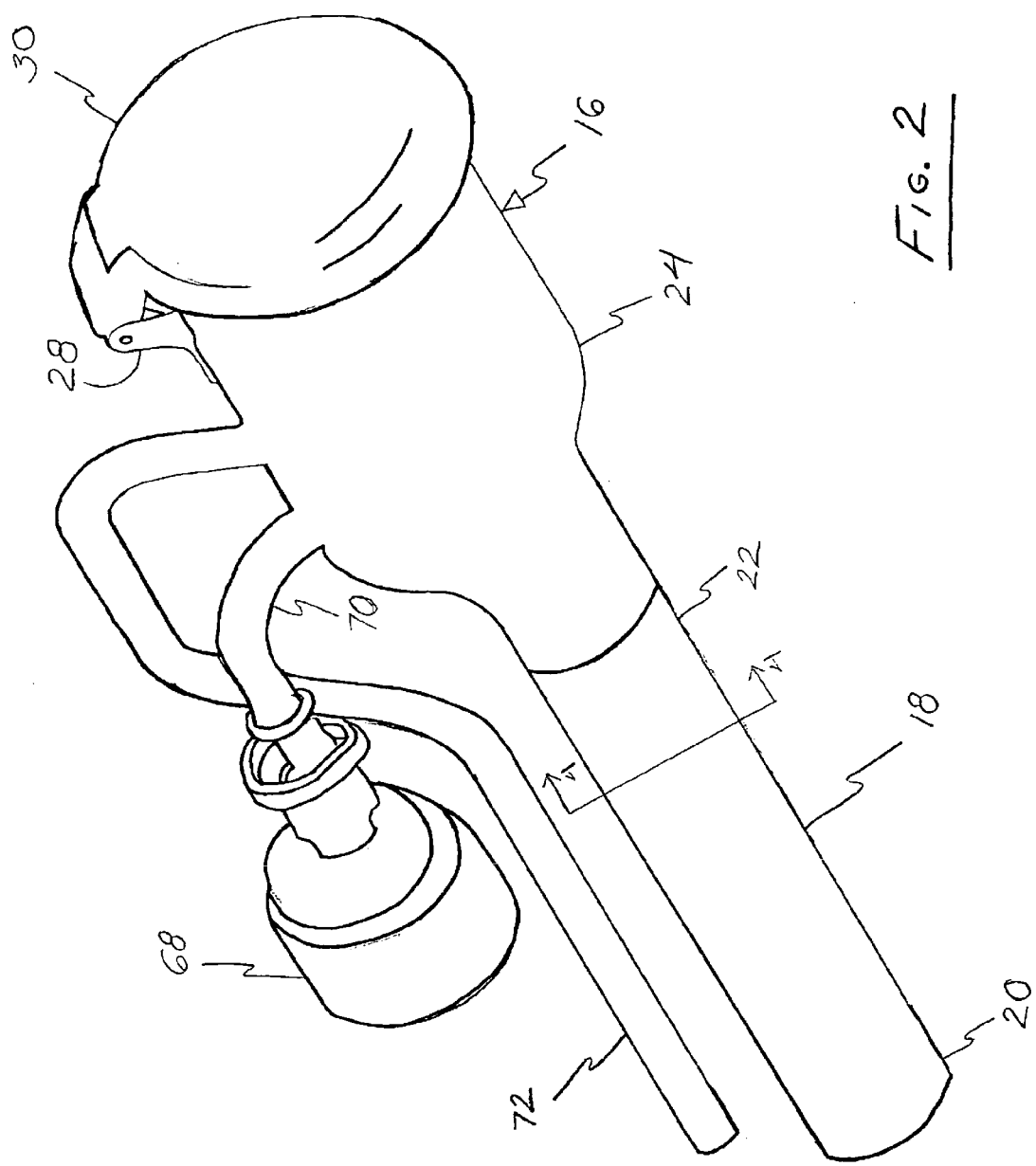
FIG. 2 is a perspective view of one embodiment of the invention with a cover thereof in a closed position.
Figure 3:
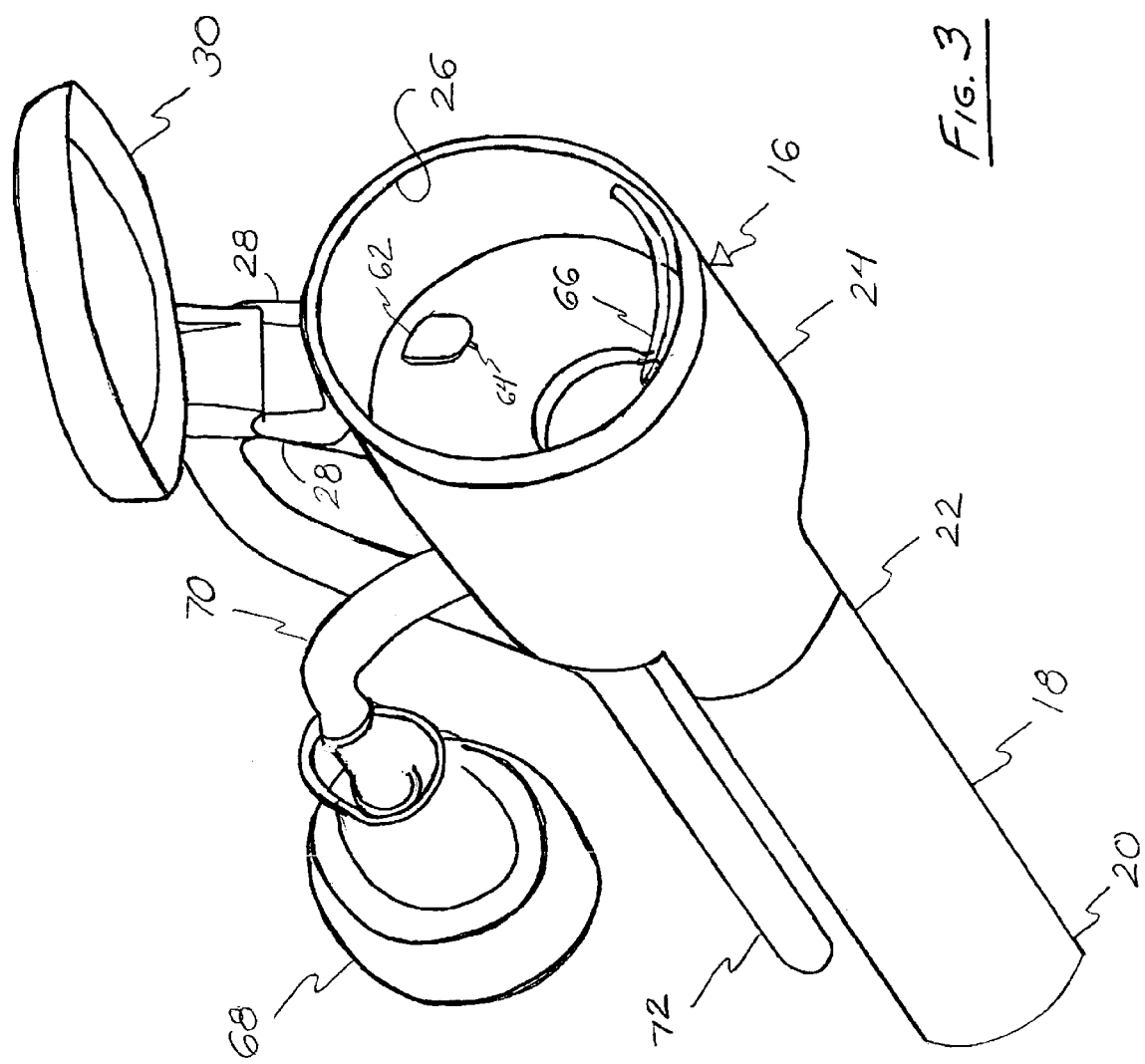
FIG. 3 is a perspective view of one embodiment of the invention with the cover thereof in an open position.
Figure 4:
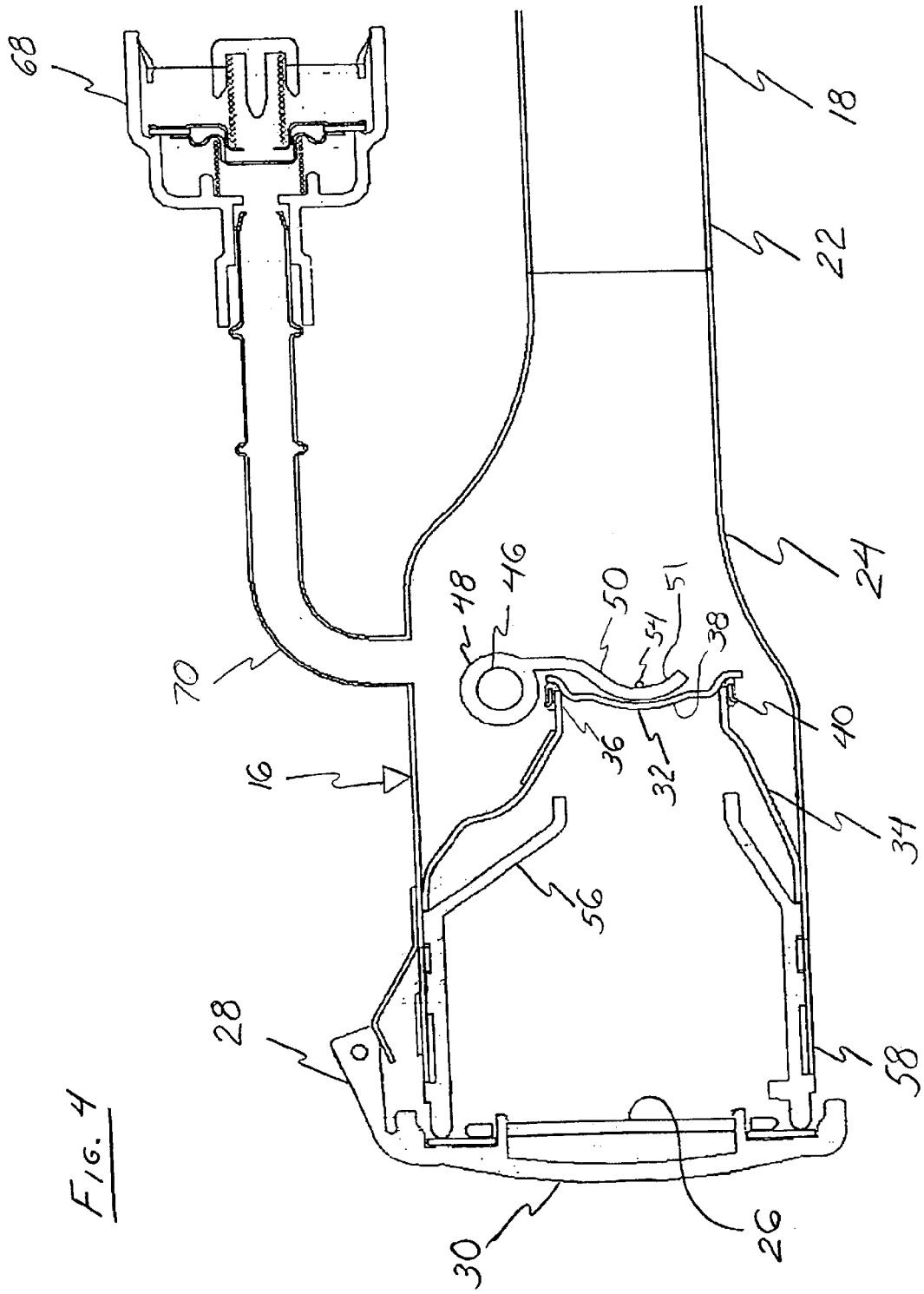
FIG. 4 is a cross-sectional side view of one embodiment of the invention taken along line 4—4 of FIG. 2.
Figure 5:
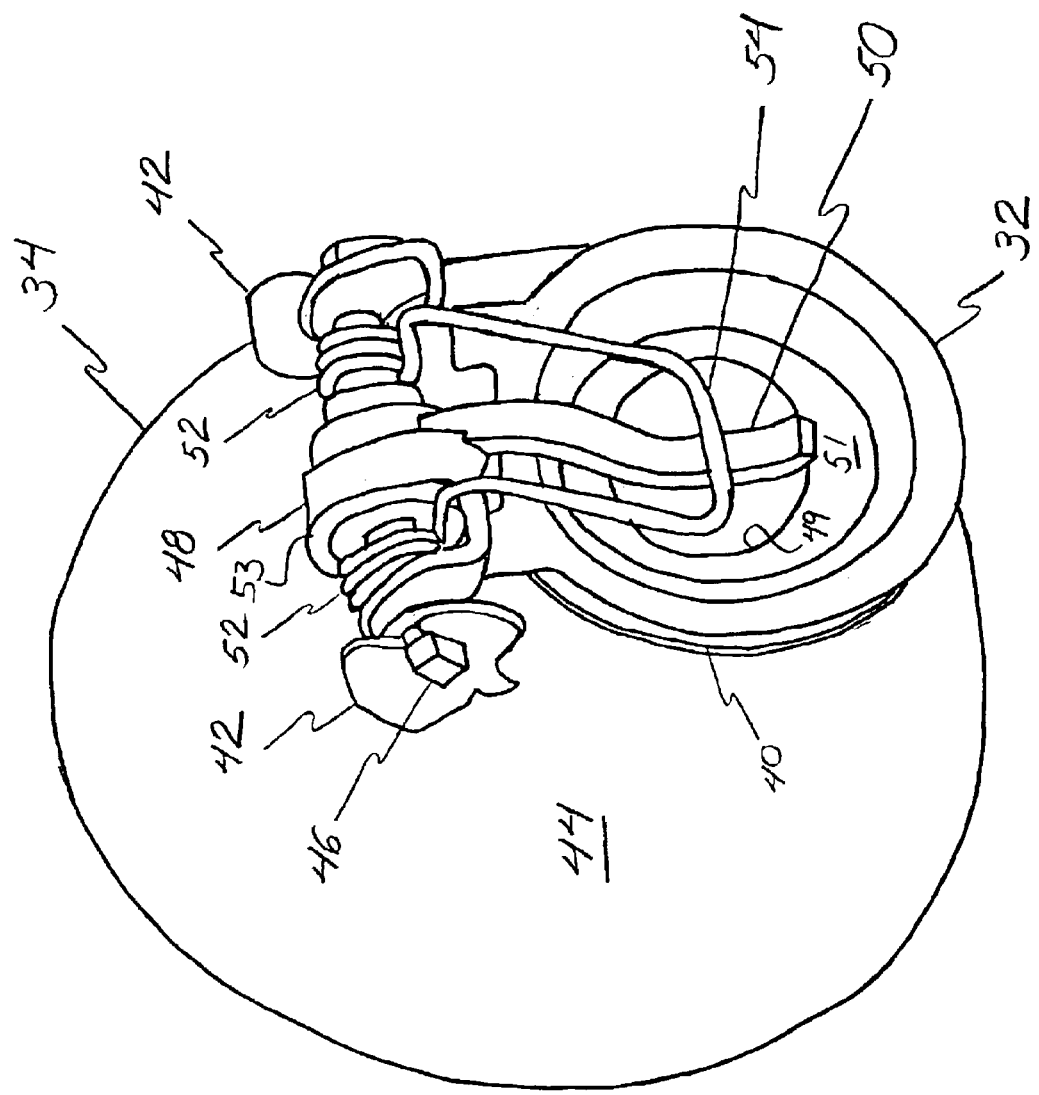
FIG. 5 is an isolated perspective view of a nozzle guide with a flapper door and dampener mechanism of one embodiment of the invention.
Figure 6:
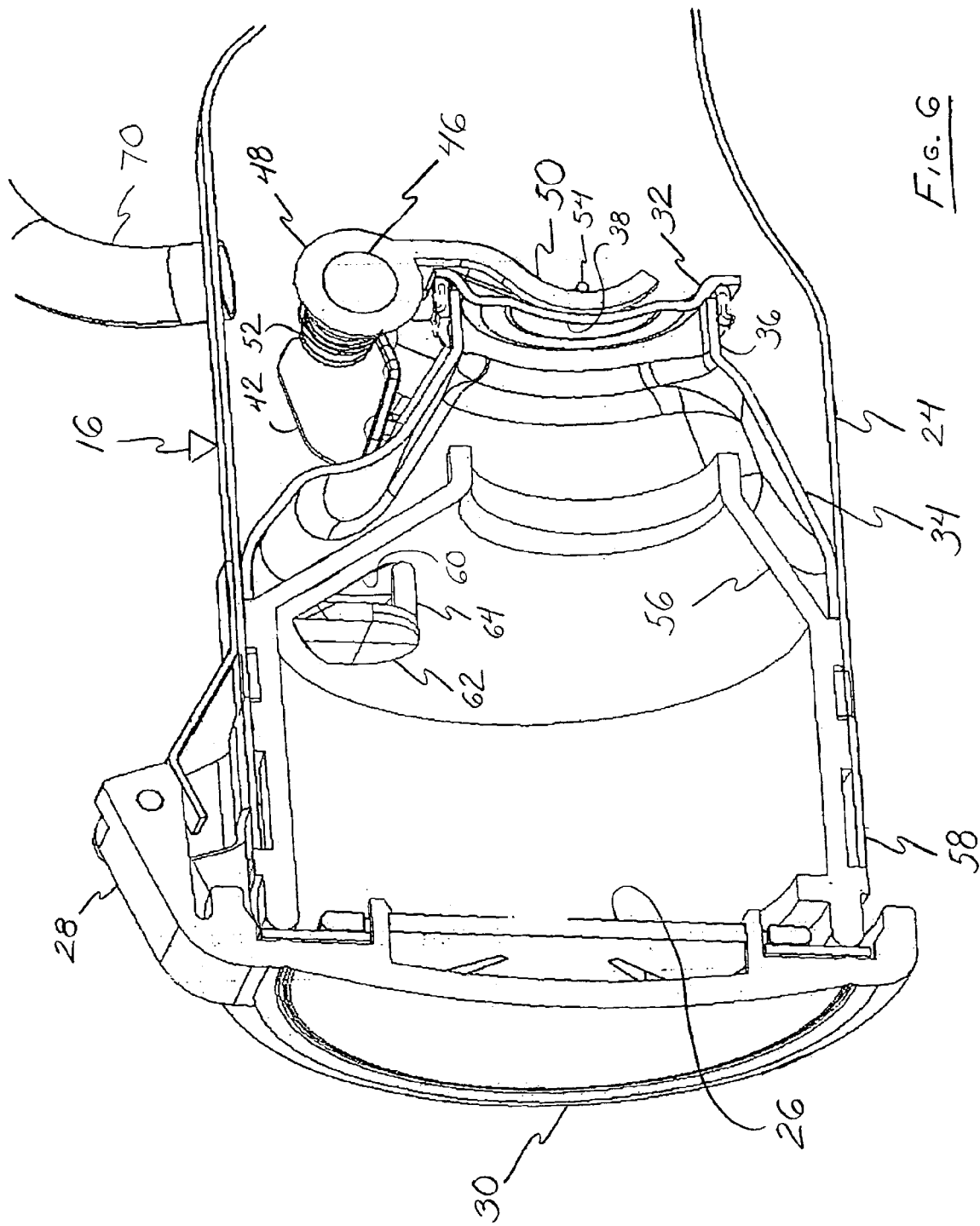
FIG. 6 is a cross-sectional perspective view showing an insert and a baffle of one embodiment of the invention.

Referring to the Figures, a fuel refilling assembly for transferring fuel from a nozzle 10 to a fuel tank 12 of a motor vehicle 14 is generally indicated at 16. The fuel refilling assembly 16 includes a fuel filler neck 18 defining a fuel flow path having a tank end 20 connected to the fuel tank 12 and a distal end 22. An access housing 24, referred to hereinafter as a housing, is fixedly secured to the distal end 22 of the fuel filler neck 18. The housing 24 defines an opening 26 for receiving the nozzle 10 therethrough. The housing 24 also includes a plurality of mounting brackets 28 at an outer end 58 thereof for pivotally securing a cover 30 thereto to cover the opening 24. The cover 30 prevents the intrusion of dust, dirt, and/or water into the housing 24, the fuel filler neck 18, and the fuel tank 12. The cover 30 is formed from plastic or a similar material.

The fuel refilling assembly 16 includes a flapper door 32 pivotally secured to the housing 24. The flapper door 32 moves between a closed position for preventing access from the housing 24 to the fuel filler neck 18, and an open position for allowing the nozzle 10 to transfer fuel to the fuel tank 12 via the fuel filler neck 18. More specifically, the flapper door 32 is moved into the open position by a force exerted thereupon by the insertion of the nozzle 10 into the fuel filler neck 18.

A nozzle guide 34 is mounted within the housing 24 to guide the nozzle 10 past the flapper door 32. The nozzle guide 34 includes a guide rim 36 defining a guide opening 38. The guide opening 38 is covered by the flapper door 32 when the flapper door 32 is in its closed position. The nozzle guide 34 includes a seal 40 for sealingly engaging the guide rim 36 of the nozzle guide 34 when the flapper door 32 is in the closed position. Thus, the seal 40 and the flapper door 32 prevent liquid and fuel vapors within the fuel filler neck 18 from moving into the housing 24. The seal 40 utilized may be any of a number of sealing devices known to those skilled in the art including, but not limited to, an elastomeric gasket.

The nozzle guide 34 includes a plurality of brackets 42 mounted along an outer surface 44 thereof. A shaft 46 extends between the plurality of brackets 42 and is fixedly secured thereto. The flapper door 32 is pivotally secured to the shaft 46. A dampener mechanism 48 is also pivotally secured to the shaft 46. The dampener mechanism 48 includes a downwardly extending tab 50 abutting the flapper door 32. Thus, the downwardly extending tab 50 will move with the flapper door 32 as the flapper door 32 moves between its closed and open positions. To further ensure such cooperative movement, the flapper door 32 defines a recessed portion 49 along an outer door surface 51 for accommodating the downwardly extending tab 50 of the dampener mechanism 48 thereagainst.

A spring 52 is pivotally secured to the shaft 46 for biasing the flapper door 32 toward the closed position. More particularly, the spring 52 has a U-shaped portion 54, the ends of which are wrapped around the shaft 46, for urging the flapper door 32 toward the closed position. The downwardly extending tab 50 of the dampener mechanism 48 is positioned, however, between the U-shaped portion 54 of the spring 52 and the flapper door 32 to maintain the downwardly extending tab 50 in an abutting relationship with the flapper door 32.

The dampener mechanism 48 is filled with a viscous liquid, which slows down the movement of the downwardly extending tab 50 as it pivots about the shaft 48 when the flapper door 32 moves to its closed position. The dampener mechanism 48 works against the spring 52 so that the flapper door 32 moves more slowly. More specifically, the dampener mechanism 48 uses the viscous liquid, housed with a dampener casing 53 that is sealed about the shaft 46, to inhibit its movement in any direction. The dampener mechanism 48 includes at least one plate which acts as a paddle by pushing the viscous liquid as the downwardly extending tab 50 is moved by the returning flapper door 32. Nifco manufactures dampener mechanisms such as these, contemplated to be incorporated into the invention. Movement of the downwardly extending tab 50 upsets the equilibrium of the viscous liquid which, inhibits the movement of the downwardly extending tab 50 by absorbing energy to overcome the momentum of the viscous liquid at rest. The dampener mechanism 48 slows the closing of the flapper door 32 to allow excess fuel that may be left in the housing 24 after removal of the nozzle 10 to flow into the fuel filler neck 18 before the flapper door 32 engages the seal 40. Thus, fuel is not left in the housing 24, from where it may escape into the outside environment during subsequent refueling of the motor vehicle 14.

The housing 24 may also includes an insert 56 mounted therewithin. The insert 56 extends between the outer end 58 of the housing 24 and the nozzle guide 34. The insert 56 defines a backflow access hole 58, which allows fuel to pass into the housing 24 when the fuel tank 12 and the fuel filler neck 18 are full. The insert 56 includes a baffle 60 disposed adjacent the access hole 58 for diverting fuel passing through the backflow access hole 58 from a projection path that would result in the fuel exiting the housing 24. The baffle 60 may be formed from plastic or metal. During a failed nozzle event, the nozzle 10 will deliver fuel to the fuel refilling assembly 16 even after the fuel filler neck 18 and the fuel tank 12 are full. The backflow access hole 58 allows the fuel to enter the housing 24 while the baffle 60 diverts this fuel downwardly so that the fuel will not spray outside the housing 24 to the outside environment.

A support beam 64 extends between the insert 56 and the baffle 60 to support the baffle 60 in place. In addition, the insert 58 includes a lip 66 formed therealong for retaining the nozzle 10 therewithin during refilling of the fuel tank 12.

It will be appreciated that the housing 24 may define the backflow access hole 58 and have the baffle 60 secured directly thereto. In addition, the lip 66 may be formed along the housing 24 for retaining the nozzle 10 therewithin during refueling. Thus, the need for a separate insert 56 is eliminated.

The housing 24 includes a valve mechanism 68 for selectively releasing pressurized fluid vapors from the fuel refilling assembly 16. A vent tube 70 interconnects the valve mechanism 68 and the housing 24. In addition, a recirculation tube 72 may be provided for transporting fuel vapors out of the fuel refilling assembly 16.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A fuel refilling assembly for transferring fuel from a nozzle to a fuel tank of a motor vehicle, said fuel refilling assembly comprising:

a fuel filler neck extending out from the fuel tank, said fuel filler neck having a tank end disposed adjacent the fuel tank and a distal end;

a housing fixedly secured to said distal end of said fuel filler neck, said housing defining an opening for receiving the nozzle therethrough;

a flapper door pivotally secured to said housing and movable between a closed position preventing access from said housing to said fuel filler neck and an open position for allowing the nozzle to transfer fuel to the fuel tank via said fuel filler neck; and a dampener mechanism abutting said flapper door, said dampener mechanism dampening the movement of said flapper door as said flapper door moves from said open position to said closed position upon the removal of the nozzle for allowing excess fuel left in said housing after the nozzle has been removed therefrom to flow into said fuel filler neck prior to said flapper door moving to said closed position.

2. A fuel refilling assembly as set forth in claim 1 including a nozzle guide mounted within said housing to guide the nozzle past said flapper door, said nozzle guide including a guide opening.

3. A fuel refilling assembly as set forth in claim 2 wherein said dampener mechanism includes a downwardly extending tab, said downwardly extending tab abutting said flapper door.

4. A fuel refilling assembly as set forth in claim 3 including a shaft fixedly secured to said nozzle guide such that said dampener mechanism and said flapper door pivot thereabout.

5. A fuel refilling assembly as set forth in claim 4 including a spring secured to said shaft for biasing said flapper door toward said closed position.

6. A fuel refilling assembly as set forth in claim 5 wherein said dampener mechanism is filled with a viscous liquid.

7. A fuel refilling assembly as set forth in claim 6 wherein said flapper door includes a seal for sealingly engaging said guide opening.

8. A fuel refilling assembly as set forth in claim 7 wherein said nozzle guide includes a plurality of brackets for securing said shaft thereto.

9. A fuel refilling assembly as set forth in claim 8 wherein said housing defines a lip for retaining the nozzle therewithin.

10. A fuel refilling assembly as set forth in claim 9 including a backflow access hole to allow fuel to pass into said housing when the fuel tank and said fuel filler neck are full.

11. A fuel refilling assembly as set forth in claim 10 including a baffle fixedly secured over said backflow access hole to divert fuel passing therethrough from exiting said housing.

12. A fuel refilling assembly as set forth in claim 11 wherein said baffle includes a support beam for supporting said baffle.

13. A fuel refilling assembly as set forth in claim 12 including a cover pivotally secured to said housing to cover said opening of said housing.

14. A fuel refilling assembly as set forth in claim 13 wherein said housing includes a valve mechanism for selectively releasing pressurized fluid from said fuel refilling assembly.

15. A fuel refilling assembly for transferring fuel from a nozzle to a fuel tank of a motor vehicle, said fuel refilling assembly comprising:

a fuel filler neck extending out from the fuel tank, said fuel filler neck having a tank end disposed adjacent the fuel tank and a distal end;

a housing secured to said distal end of said fuel filler neck, said housing defining an opening for receiving the nozzle therethrough;

an insert mounted within said housing and defining a backflow access hole;

a baffle fixedly secured to said insert for preventing the fuel from flowing through said backflow access hole and out of said opening by diverting the fuel downwardly;

a flapper door pivotally secured to said housing and movable between a closed position preventing access from said housing to said fuel filler neck and an open position for allowing the nozzle to transfer fuel to the fuel tank via said fuel filler neck; and a dampener mechanism abutting said flapper door for dampening the movement of said flapper door as said flapper door moves from said open position to said closed position upon the removal of the nozzle for allowing excess fuel left in said housing after the nozzle has been removed therefrom to flow into said fuel filler neck prior to said flapper door moving to said closed position;

and wherein said insert defines a lip for retaining the nozzle therewithin and includes a support beam for supporting said baffle.

16. A fuel refilling assembly as set forth in claim 15 including a nozzle guide mounted within said housing to guide the nozzle past said flapper door, said nozzle guide including a guide opening.

17. A fuel refilling assembly as set forth in claim 16 wherein said dampener mechanism includes a downwardly extending tab, said downwardly extending tab abutting said flapper door.

18. A fuel refilling assembly as set forth in claim 17 including a shaft fixedly secured to said nozzle guide such that said dampener mechanism and said flapper door pivot thereabout.

19. A fuel refilling assembly as set forth in claim 18 including a spring secured to said shaft for biasing said flapper door toward said closed position.

20. A fuel refilling assembly as set forth in claim 19 wherein said dampener mechanism is filled with a viscous liquid.

21. A fuel refilling assembly as set forth in claim 20 wherein said flapper door includes a seal for sealingly engaging said guide opening.

22. A fuel refilling assembly as set forth in claim 21 wherein said nozzle guide includes a plurality of brackets for securing said shaft thereto.

23. A fuel refilling assembly as set forth in claim 22 including a cover pivotally secured to said housing to cover said opening of said housing.

24. A fuel refilling assembly as set forth in claim 23 wherein said housing includes a valve mechanism for selectively releasing pressurized fluid from said fuel refilling assembly.

* * * * *